(12) United States Patent
Kaniyar et al.

(10) Patent No.: US 7,784,096 B2
(45) Date of Patent: Aug. 24, 2010

(54) OUTGOING CONNECTION ATTEMPT LIMITING TO SLOW DOWN SPREADING OF VIRUSES

(75) Inventors: Sanjay N. Kaniyar, Redmond, WA (US); Christian Huitema, Clyde Hill, WA (US); Henry L. Sanders, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1023 days.

(21) Appl. No.: 10/989,912

(22) Filed: Nov. 15, 2004

(65) Prior Publication Data

US 2006/0107322 A1    May 18, 2006

(51) Int. Cl.
G06F 11/00    (2006.01)
G06F 12/16    (2006.01)

(52) U.S. Cl. .............................. 726/23; 726/22; 726/24; 726/25

(58) Field of Classification Search ............... 726/23–25
See application file for complete search history.

(56) References Cited

U.S. PATENT DOCUMENTS

| | | | | |
|---|---|---|---|---|
| 5,345,578 A * | 9/1994 | Manasse | | 711/146 |
| 5,414,704 A * | 5/1995 | Spinney | | 370/389 |
| 5,920,900 A * | 7/1999 | Poole et al. | | 711/216 |
| 6,421,343 B1 * | 7/2002 | Jun et al. | | 370/395.72 |
| 6,453,356 B1 * | 9/2002 | Sheard et al. | | 709/231 |
| 6,823,387 B1 | 11/2004 | Srinivas | | |
| 6,877,090 B2 * | 4/2005 | Lee | | 712/239 |
| 7,020,713 B1 * | 3/2006 | Shah et al. | | 709/235 |
| 7,266,754 B2 * | 9/2007 | Shah et al. | | 714/776 |
| 2002/0199116 A1 * | 12/2002 | Hoene et al. | | 713/201 |
| 2003/0079146 A1 | 4/2003 | Burstein | | |
| 2003/0226034 A1 * | 12/2003 | Howard et al. | | 713/201 |
| 2004/0062246 A1 * | 4/2004 | Boucher et al. | | 370/392 |
| 2004/0073703 A1 * | 4/2004 | Boucher et al. | | 709/245 |
| 2004/0078460 A1 | 4/2004 | Valavi et al. | | |
| 2004/0128553 A1 * | 7/2004 | Buer et al. | | 713/201 |
| 2004/0225877 A1 * | 11/2004 | Huang | | 713/100 |
| 2004/0250114 A1 * | 12/2004 | Parekh et al. | | 713/201 |
| 2004/0250127 A1 * | 12/2004 | Scoredos et al. | | 713/201 |
| 2005/0005165 A1 | 1/2005 | Morgan et al. | | |
| 2005/0027872 A1 | 2/2005 | Srinivas | | |
| 2005/0060535 A1 * | 3/2005 | Bartas | | 713/154 |
| 2005/0204058 A1 * | 9/2005 | Philbrick et al. | | 709/238 |
| 2005/0246767 A1 * | 11/2005 | Fazal et al. | | 726/11 |
| 2005/0265233 A1 * | 12/2005 | Johnson et al. | | 370/229 |
| 2006/0050866 A1 * | 3/2006 | Sewall | | 379/428.02 |
| 2006/0072451 A1 * | 4/2006 | Ross | | 370/229 |

\* cited by examiner

*Primary Examiner*—Emmanuel L Moise
*Assistant Examiner*—Luu Pham
(74) *Attorney, Agent, or Firm*—Wolf, Greenfield & Sacks, P.C.

(57) ABSTRACT

Disclosed is a method for slowing down the spread of viruses by limiting the number of Transmission Control Protocol ("TCP") connection attempts to arbitrary Internet Protocol ("IP") addresses that can be in progress at any given time—a common method employed by viruses to spread to other hosts from an infected host. This is achieved by setting a small limit on the number of connection attempt requests that can be in progress at any given time and can be implemented regardless of whether anti-virus software is installed on the system.

18 Claims, 3 Drawing Sheets

OUTGOING CONNECTION ATTEMPT LIMITING TO SLOW DOWN SPREADING OF VIRUSES

TECHNICAL FIELD

The present invention pertains to computer systems and computer viruses and, more particularly, to methods for reducing the spread of computer viruses by limiting outgoing connection attempts.

BACKGROUND OF THE INVENTION

Viruses, worms, and trojan horses are malicious programs that can cause damage to computers and information on computer systems, slow down the Internet, and use infected computers to spread themselves to acquaintances, co-workers, and other computers on the World Wide Web. A virus is a piece of computer code that attaches itself to a host program or file so it can spread from computer to computer, infecting as it travels. Viruses can damage software, hardware, and/or data.

A particular subclass of viruses called a worm is designed to copy itself from one computer to another, but it does so automatically by taking control of features on the computer that can transport files or information. Once a worm is present in the system it generally spreads without user action and distributes complete copies (possibly modified) of itself across networks. A significant danger of worms is their ability to replicate in great volume. For example, a worm could send out copies of itself to everyone listed in a user's e-mail address book, and these recipient computers would then do the same, causing a domino effect of heavy network traffic that would slow down business networks and the Internet as a whole. When new worms are unleashed, they can spread very quickly, clogging networks and consuming memory or network bandwidth, thus causing a computer to stop responding and possibly making users wait twice as long, or even longer, to view Web pages on the Internet. Because worms do not necessarily travel via a host program or file, they can also tunnel into the affected system and allow a third party to take control of the system remotely. Additionally, some worms have been designed to cause the infected hosts to launch SYN attacks, a form of Denial of Service attack, on a web server at the same time. Recent examples of worms included the Sasser worm and the Blaster worm.

A trojan horse is a computer program that appears to be useful software but instead compromises system security and causes damage. For example, a recent trojan horse came in the form of an e-mail that included attachments claiming to be security updates from Microsoft Corporation of Redmond, Wash., but turned out to be viruses that attempted to disable antivirus and firewall software. Trojan horses spread when users are lured into opening a program because they think it comes from a legitimate source. Trojan horses can also be included in software that is downloaded by a user.

Virtually all viruses and many worms cannot spread unless a user opens or runs an infected program. Many of the most dangerous viruses have been primarily spread through e-mail attachments—the files that are sent along with an e-mail message. Photos, textual documents, and even spreadsheets are just some of the file types that might be received through e-mail. The virus is launched when the user opens the file attachment, usually by double-clicking the attachment icon. As a result, many organizations and individuals have adopted policies of deleting e-mail containing attachments received from unfamiliar parties. Unfortunately, such a policy no longer ensures that a user can safely open attachments from people he or she knows as viruses and worms have demonstrated the ability to access information in e-mail programs and send themselves to everyone listed in a user's address book. While less common, other viruses can spread through programs downloaded from the Internet or from virus-ridden removable storage media.

Installing up-to-date antivirus software on a computer is by far the most prevalent way to identify and remove viruses. Unfortunately, virus cleansing and repair remains a reactionary process whereby the necessary virus definition files are distributed upon identification of the virus "in the wild." Time is therefore of the essence in distributing the virus definition files to stanch the spread of the virus. The virus definition development life-cycle is typically characterized as a very short "ship cycle." As soon as a new antivirus definition file is available, it is shipped and made available for download to the antivirus subscribers. The frequency of such updates to antivirus programs is quite high. When a new virus is first identified, the virus definition distribution servers can become overloaded with requests or could even be made unavailable (e.g., through a Denial of Service attack or some similar nefarious method) as part of the scheme to further propagate the spread of the virus.

Accordingly, a need exists for a method or program that is able to slow the propagation of viruses across networks once a system has been infected, and, preferably without the need of an updated virus definition file for an anti-virus program, or any third party anti-virus software for that matter. The invention provides such a method. These and other advantages of the invention, as well as additional inventive features, will be apparent from the description of the invention provided herein.

SUMMARY OF THE INVENTION

In view of the foregoing, the present invention provides a method for slowing down the number of Transmission Control Protocol ("TCP") connection attempts that can be made to arbitrary Internet Protocol ("IP") addresses—a common method employed by viruses to spread to other hosts from an infected host. This is achieved by setting a small limit on the number of connection attempt requests that can be in progress at any given time and can be implemented regardless of whether or not anti-virus software is installed on the system.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

In the description that follows, the invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the computing device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

I. Exemplary Environment

Figure 1:
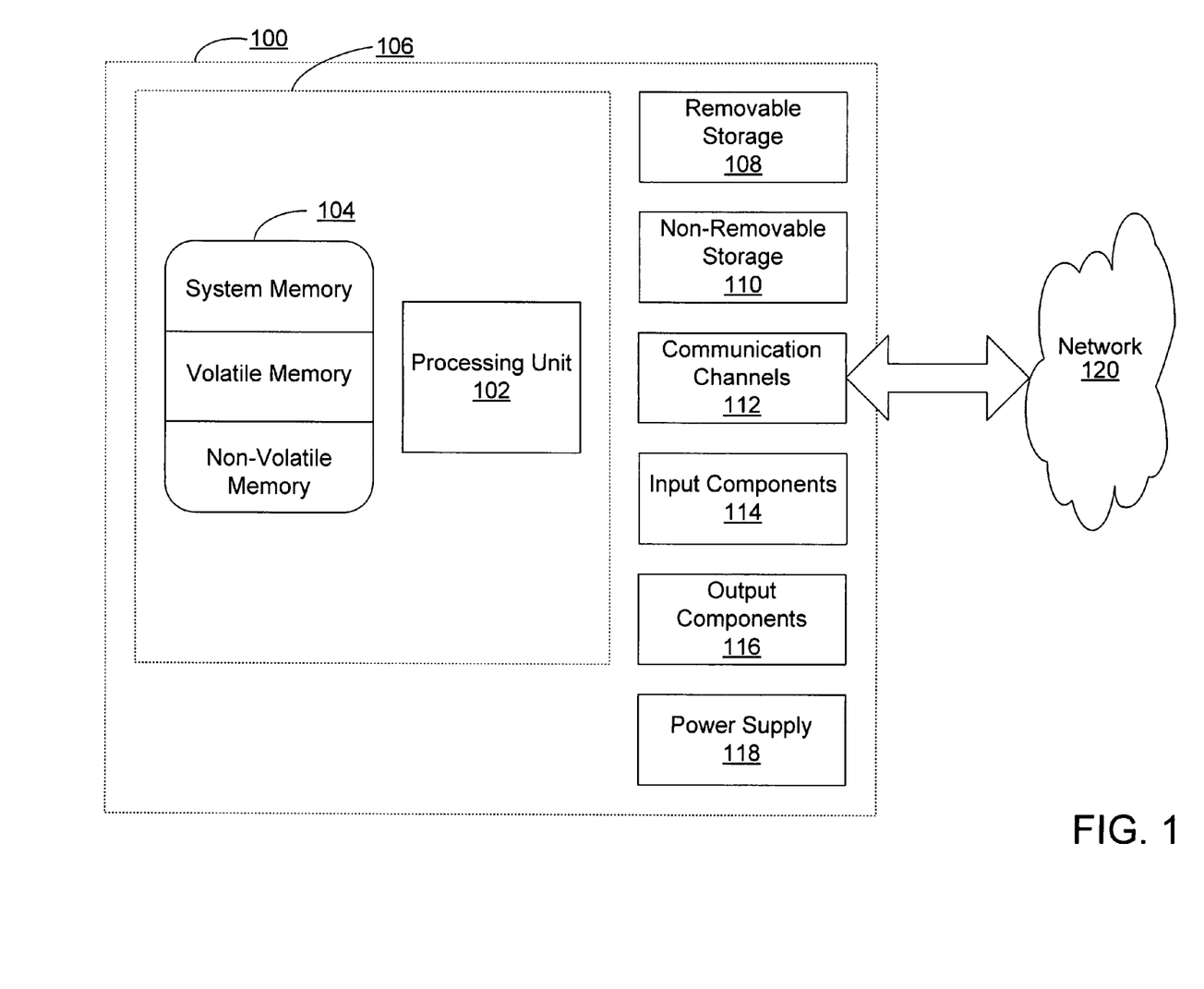
FIG. 1 is a schematic diagram of an exemplary computer architecture on which the method of the invention can be implemented.

Referring to FIG. 1, the present invention relates to slowing down the number of TCP connection attempts that can be made to arbitrary IP addresses from an infected computer. The computer can be a device that may have one of many different computer architectures. For descriptive purposes, FIG. 1 shows a schematic diagram of an exemplary architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device 100 typically includes at least one processing unit 102 and memory 104. The memory 104 may be volatile (such as RAM), non-volatile (such as ROM and flash memory), or some combination of the two. This most basic configuration is illustrated in FIG. 1 by the dashed line 106.

Computing device 100 can also contain storage media devices 108 and 110 that may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing device.

Computing device 100 can also contain communication channels 112 that allow it to communicate with other devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The computing device 100 may also have input components 114 such as a keyboard, mouse, pen, a voice-input component, and a touch-input device. Output components 116 include screen displays, speakers, printers, and rendering modules (often called "adapters") for driving them. The computing device 100 has a power supply 118. All these components are well known in the art and need not be discussed at length here.

II. Spreading of Viruses Via Arbitrary TCP Connections

Figure 2:
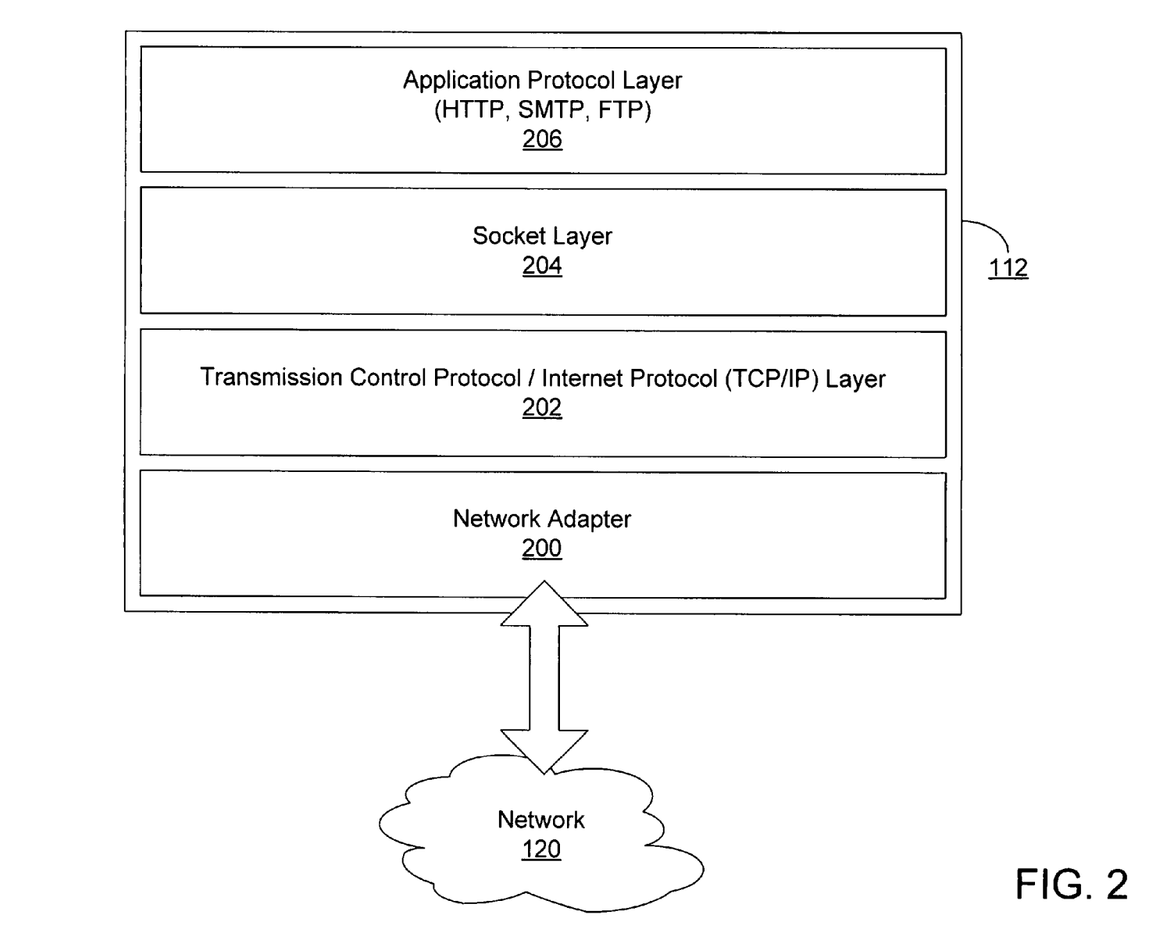
FIG. 2 is a schematic diagram showing an exemplary network communications architecture.

The present invention is directed to a method for slowing down the number of TCP connection attempts that can be made to arbitrary IP addresses from an infected computer. Referring to FIG. 2, an exemplary network communications architecture is illustrated.

The topmost layer is the application protocol layer 206. Typically this layer will comprise any of the common "Internet" application protocols such as the Hypertext Transfer Protocol ("HTTP"), Simple Mail Transfer Protocol ("SMTP"), or File Transfer Protocol ("FTP"). As will be recognized by one of ordinary skill in the art, while these protocols are regularly referred to in the art as Internet protocols, these protocols are also widely used, for example, within Local Area Network ("LAN") environments and have been come to be called Internet protocols due to their initial development for use in the Internet arena.

Residing immediately below the application protocol layer is the socket layer 204. It is the socket layer 204 that facilitates the interchange of data between the application protocol layer and the TCP layer 202. The TCP layer 202 prepares the data for the network adapter 200 to be transmitted across the network 120. While to this point the layers of the network communications architecture have been described as facilitating outbound data transmission, one of ordinary skill in the art will also recognize that the various layers work in an analogous fashion to facilitate the handling of inbound network traffic.

Using the widely employed HTTP protocol for illustrative purposes, a typical communication leveraging TCP will now be described in detail. HTTP is commonly used for the transmission of hypertext data, such as to and from a web page rendered and displayed within a web browser. A user can, for example, click a hyperlink displayed on a web page rendered within a web browser on their system desktop. The browser will then call the HTTP component 206 which will parse out the hyperlink command to determine the Uniform Resource Locator ("URL") that the link is attempting to resolve. Next, the socket layer 204 issues a connect and then will remain in a waiting state for the connection to complete.

At the TCP layer 202 level, the TCP module will then initiate a new connection. TCP connections comprise three phases: connection establishment, data transfer, and connection termination. A 3-way handshake is used to establish a connection. While it is technically possible for a pair of end hosts to initiate a connection between themselves simultaneously, typically one end opens a socket and listens passively for a connection from the other. This is commonly referred to as a passive open, and it designates the server-side of a connection, such as in the present example a web server.

The client-side of a connection initiates an active open by sending an initial SYN segment (a synchronize packet used by TCP when initiating a new connection to synchronize the clocks on the two connecting computers) to the server as part of the 3-way handshake. The server-side then responds to a valid SYN request with a SYN/ACK (ACK packets are used to "acknowledge" receipt of a packet; they are used by both ends of the connection to move in between states). Finally, the client-side then responds to the server with an ACK, completing the 3-way handshake and connection establishment phase.

TCP uses the notion of port numbers to identify sending and receiving applications. Each side of a TCP connection has an associated 16-bit unsigned port number assigned to the sending or receiving application. Ports are categorized into three basic categories: well known, registered and dynamic/private. The well known ports (those in the range 0-1023) are assigned by the Internet Assigned Numbers Authority (IANA is an organization that oversees IP address, top level domain and Internet protocol code point allocations) and are typically used by system-level or root processes. Well known applications running as servers and passively listening for connections typically use these ports. Some examples include: FTP (21), TELNET (23), SMTP (25) and HTTP (80). Registered ports (those in the range 1024-49151) are typically used by end user applications as ephemeral source ports when contacting servers, but they can also identify named services that have been registered by a third party. Dynamic/private ports (those in the range 49152-65535) can also be used by end user applications, but less commonly so. Dynamic/private ports do not contain any meaning outside of any particular TCP connection. There are 65535 possible ports officially recognized. In the popular Microsoft Windows® family of operating systems by Microsoft Corporation of Redmond, Wash. the ephemeral ports are, by default, those in the range of 1025-5000.

Recognizing that a large number of computers today possess Internet connectivity, and hence TCP/IP functionality, virus authors have seized upon this fact to enable the rapid proliferation of their viruses. Two recent examples of this are the Sasser and Blaster worms.

After initially installing itself on the host, the Sasser worm starts an FTP server, used to spread the worm to other hosts, on TCP port 5554. The Sasser worm then retrieves the IP addresses of the infected computer, using the Windows® API, gethostbyname and generates another IP address, based on one of the IP addresses retrieved from the infected computer. This process is made up of 128 threads, which demands a large amount of CPU time. As a result, an infected computer may become quite slow, to the point of being barely usable. The worm then connects to the generated IP address on TCP port 445 to determine if a remote computer is online. If a connection is made to a remote computer, the worm will send shell code to it, which may cause it to open a remote shell on TCP port 9996. The worm uses the shell on the remote computer to reconnect to the infected computer's FTP server, running on TCP port 5554, and retrieve a copy of the worm.

After initially installing itself on the host, the Blaster worm generates an IP address and attempts to find and exploit a computer with the IP address. The worm will then increment the IP address by 1, attempting to find and exploit other computers based on the new IP address. The worm sends data on TCP port 135 that may exploit a vulnerability in the DCOM (Distributed Component Object Model) RPC (Remote Procedure Call) architecture. When the worm receives a request from a computer to which it was able to connect using the DCOM RPC exploit, it will send msblast.exe to that computer and instruct the recipient computer to execute the worm. While the Blaster worm is executing the local subnet will become saturated with 135 requests, making the host barely, if at all, usable. The worm also uses Cmd.exe to create a hidden remote shell process that will listen on TCP port 4444, allowing an attacker to issue remote commands on an infected system.

If the current date is the 16th through the end of the month for the months of January to August, or if the current month is September through December, the Blaster worm will also attempt to perform a Denial of Service ("DoS") attack on Microsoft Windows® Update. The DoS is a SYN flood on port 80 of windowsupdate.com. The worm attempts to send 50 HTTP packets, each packet 40 bytes in length, every second. If the worm cannot find a DNS (Domain Name Services) entry for windowsupdate.com, it uses a destination address of 255.255.255.255.

As illustrated by the above examples a virus can unleash a massive number of TCP connection attempts to arbitrary IP addresses, thereby clogging networks and consuming memory or network bandwidth causing a computer to possibly stop responding entirely. The present invention discloses a method to slow down the number of TCP connection attempts that can be made to arbitrary addresses. This is achieved by setting a small limit on the number of connection attempt requests that can be in progress at any given time.

III. Outgoing Connection Attempt Limiting

Figure 3:
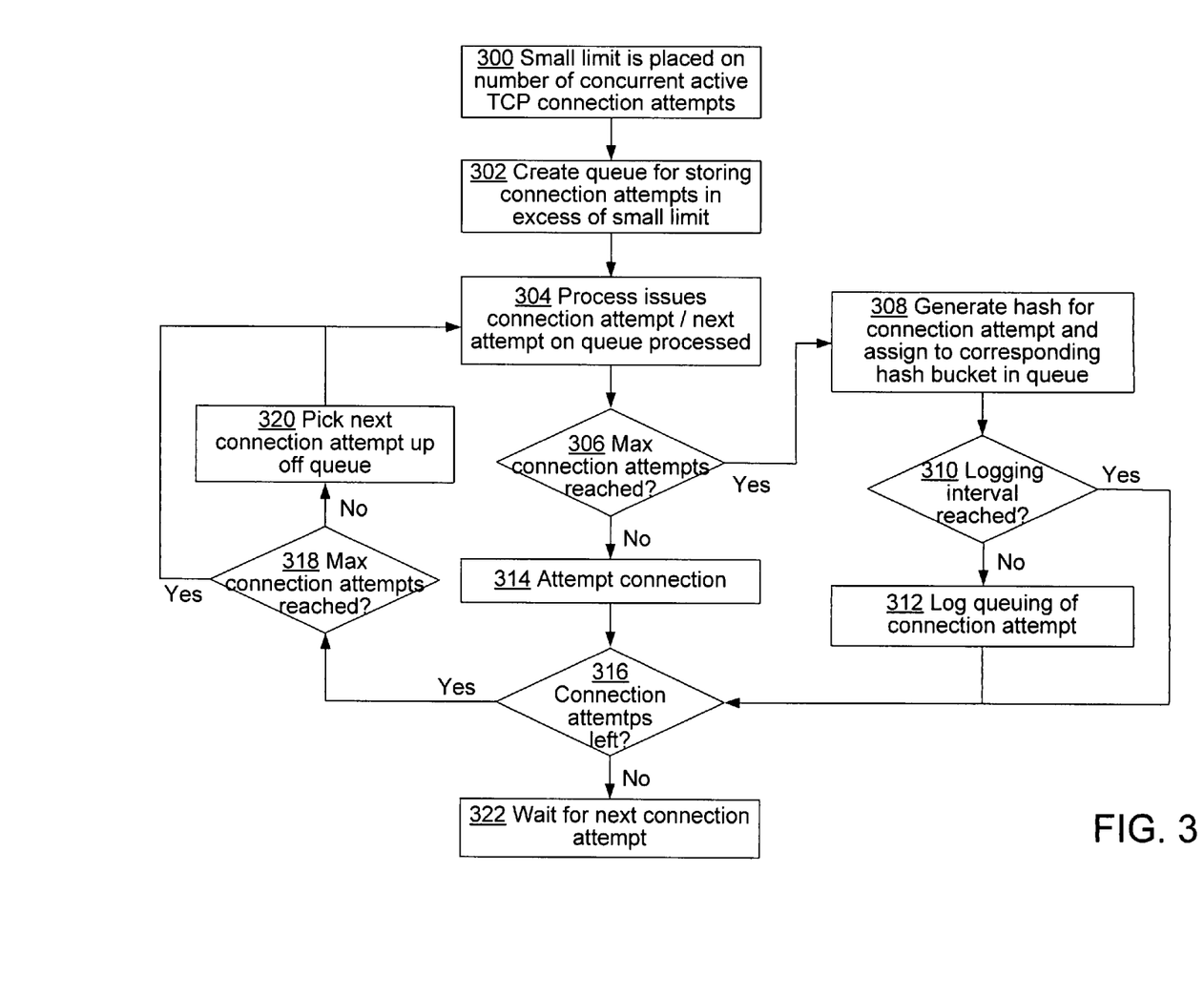
FIG. 3 is a flowchart illustrating the method for slowing down the number of TCP connection attempts that can be made to arbitrary IP addresses.

With reference to FIG. 3, by setting a small limit on the number of connection attempt requests that can be in progress at any given time 300, the number of TCP connection attempts that can be made to arbitrary addresses can be effectively curtailed. In one exemplary embodiment, the limit chosen for the number of connection attempt requests that can be in progress at any given time is 10. A limit of 10 concurrent connection attempt requests sufficiently slows down the rate of malicious connection attempts while allowing valid connection attempts to proceed unhindered The 10 connection attempt request limit is also sufficiently high enough to serve most conceivable scenarios.

While this particular embodiment utilizes a connection attempt limit of 10, one of ordinary skill in the art will of course appreciate that this limit could be increased, or even potentially decreased. For example, this number could possibly be brought down further if it is determined that doing so would not affect any legitimate applications. Additionally, while the connection attempt threshold endeavors to not exceed the set limit of concurrent connection attempts, the threshold is not strictly implemented. For example, during race conditions there may be one or two additional active connection attempts in progress. This is done in an effort to keep the implementation as simple as possible and to avoid grabbing global spinlocks for longer durations.

Connection attempts in excess of the connection attempt limit can be stored in a queue 302, 308. Connection attempt requests in the queue may be cancelled at any time. Additionally, in a particular embodiment no limit is placed on the queue depth. As discussed above, when a virus is trying to spread actively on a host, it will do so by trying to connect to many destinations at the same time and most likely will have a large number of outstanding connection attempts queued up. If a strict FIFO (First In, First Out) procedure is followed and any new incoming requests are queued up at the end of the existing ones, the legitimate connection attempts would need to wait for an extended period of time to attempt to start connecting. For example, each connection attempt takes approximately 20 seconds to fail, assuming it is attempting to connect in a vacuum, and when a virus is active, most of its connection attempts fall into this failure category. Since each set of 10 attempts takes 20 seconds to fail, a valid connection attempt will have to wait for approximately (n/10)*20=2*n seconds for its turn (where n is the number of connection attempts by the virus). Most applications will not wait this long, but will instead be terminated either by user intervention or by an application timeout. In effect, the host on which a virus is active would still become largely unusable.

To alleviate the aforementioned problem a hashtable approach can be used to provide a greater degree of fairness across processes. One approach to isolate the malicious connection attempts is by means of the process ID associated with the connecting process. When a connection attempt is issued, a hash is generated 308 by XORing the address of the process structure (not the PID, but the process data structure in the kernel) and based on the generated hash a hash bucket 308 is chosen. The specific connection attempt is queued at the end of the existing connection attempts 308 in the hash bucket and processed in FIFO order. By employing this scheme, the likelihood of a valid connection attempt from an uninfected process succeeding is much higher.

Any time a host is in a state where its connection attempt gets queued because the number of active connection attempts has exceeded the threshold, that event can be logged in the event log 312. Subsequent queuing events can be incrementally delayed in reporting 310. For example for the next 14 minutes, the logged event may not be logged again even if the same event happens multiple times. If this event occurs again after 14 minutes, it can logged again and the interval for next logging can be doubled to 28 minutes. This process can continue until the interval is 310 days and when this threshold is reached that interval can be set. One of ordinary skill in the art will realize that these numbers are merely exemplary and were chosen as such for implementation simplicity while also making sure that the log would not be flooded with messages if the above scenario occurs too often (which might be common is some rare cases).

Situations can exist where users hitting the 10 connection attempt limit will perceive some slowness in response. In particular, this can be seen when using an Internet Explorer® registry key to open 10 connection attempts to each server as opposed to the default of two. Steps can be taken to address such a situation. Since a virus tries to reach different IP addresses, there is likely no reason why a virus would try more than one connection attempt to each address. Thus, this limit on the number of different destinations rather than number of connection attempts itself can be enforced.

Furthermore, it may not be desirable to limit connection attempts that are going to a destination that is known to be reachable. Therefore, the above algorithm can be modified as follows: (1) a route cache entry (i.e., RCE, a data structure that tracks a particular destination IP address) is considered reachable if it is possible to successfully complete an active connection attempt over it; (2) an RCE is considered constrained if there is an ongoing connection attempt on it being counted towards the outstanding connection attempt count; (3) when a connection attempt is made, the transmission control block (TCB) opens an RCE—if the RCE is not reachable and not constrained, then the RCE is marked constrained and the TCB is marked constrained and the outstanding connection attempt count is incremented; (4) when the connection attempt succeeds and the connection state moves to ESTAB (connection successfully established), the RCE is marked reachable (and unconstrained), and the outstanding connection attempt count is decremented; (5) if the connection attempt on a constrained TCB fails because of timeouts, the RCE is marked unconstrained, and the outstanding connection attempt count is decremented.

One of the basic assumptions of the present method is that a connection attempt to a randomly guessed IP address will be in progress for 20 seconds. Since most of the Internet has a round trip time (RTT) of much less than that, a virus may decide to wait for at most one second before it tries the next destination to reach, canceling a connection attempt after one second and then trying the next one. This would effectively enable the virus to try 10 destinations a second, basically defeating the mitigation contemplated by the present invention. Thus, it may be desirable that this behavior be taken into account. Accordingly, every time a connection attempt is cancelled, it is treated equivalently to a connection attempt in progress for another 10 seconds. This only applies to connection attempts that are constrained as per the above definition.

In view of the many possible embodiments to which the principles of this invention may be applied, it should be recognized that the embodiments described herein with respect to the drawing figures are meant to be illustrative only and should not be taken as limiting the scope of invention. For example, for performance reasons the method of the present invention may be implemented in hardware, rather than in software. Therefore, the invention as described herein contemplates all such embodiments as may come within the scope of the following claims and equivalents thereof.

What is claimed is:

1. A method for slowing computer malware from spreading beyond a host computer system, the method comprising:

setting an upper bound limit on a total number of concurrent transmission control protocol (TCP) network connection attempts that can be made from the host computer system; and when a connecting process issues a connection attempt and a number of TCP network connection attempts in progress exceeds the upper bound limit:

generating a hash value for the connecting process by applying an exclusive "OR" (XOR)-based hash function to an address of a process structure in a kernel of the connecting process;

selecting a hash bucket for the connection attempt based on the hash value;

queuing the connection attempt in the corresponding hash bucket, wherein connection attempts in the hash bucket are processed in a first-in-first-out (FIFO) order;

when a route cache entry (RCE) of the connection attempt is not reachable and does not have an ongoing connection attempt being counted towards an outstanding connection attempt count, marking the RCE as constrained, and
incrementing the outstanding connection attempt count;
when the connection attempt succeeds,
marking the RCE as reachable, and
decrementing the outstanding connection attempt count;
and
when the connection attempt fails in response to an expiration of a predetermined amount of time,
marking the RCE unconstrained, and
decrementing the outstanding connection attempt count.

2. The method of claim 1 further comprising logging the queuing of the connection attempt.

3. The method of claim 2 further comprising repeating the logging after an interval of time, wherein the queuing of the connection attempt occurs repeatedly during, and up to, the interval of time.

4. A method for slowing computer malware from spreading beyond a host computer system, the method comprising:
setting an upper bound limit on a total number of transmission control protocol (TCP) network connection attempts that can be made from the host computer system to requested destinations;
when a connecting process issues a connection attempt and a number of TCP network connection attempts in progress exceeds the upper bound limit:
generating a hash value for a connecting process by applying an exclusive "OR" (XOR)-based hash function to an address of a process structure in a kernel of the connecting process;
selecting a hash bucket for the connection attempt based on the hash value;
queuing the connection attempt in the corresponding hash bucket, wherein connection attempts in the hash bucket are processed in a first-in-first-out (FIFO) order;
when a transmission control block (TCB) opens a route cache entry (RCE) of the connection attempt that is not reachable and does not have an ongoing connection attempt being counted towards an outstanding connection attempt count,
marking the RCE as constrained, and
incrementing the outstanding connection attempt count; and
when the connection attempt fails in response to an expiration of a predetermined amount of time,
marking the RCE unconstrained, and
decrementing the outstanding connection attempt count.

5. The method of claim 4 further comprising:
decrementing the outstanding connection attempt count if an RCE is reachable; and
decrementing the outstanding connection attempt count if a connection attempt times out.

6. The method of claim 4 further comprising maintaining a connection attempt as in progress for a time interval after the connection attempt is cancelled, wherein the connection attempt is an ongoing connection attempt being counted towards the outstanding connection attempt count.

7. The method of claim 4 further comprising logging the queuing of the connection attempt.

8. The method of claim 7 further comprising repeating the logging after an interval of time, wherein the queuing of the connection attempt occurs repeatedly during, and up to, the interval of time.

9. A computer storage memory device having stored thereon computer-executable instructions for performing a method for slowing computer malware from spreading beyond a host computer system, the method comprising:
setting an upper bound limit on a total number of concurrent transmission control protocol (TCP) network connection attempts that can be made from the host computer system; and
when a connecting process issues a connection attempt and a number of TCP network connection attempts in progress exceeds the upper bound limit:
selecting a hash bucket for the connection attempt based on the hash value; and
queuing the connection attempt in the corresponding hash bucket, wherein connection attempts in the hash bucket are processed in a first-in-first-out (FIFO) order;
when a route cache entry (RCE) of the connection attempt is not reachable and does not have an ongoing connection attempt being counted towards an outstanding connection attempt count,
marking the RCE as constrained, and
incrementing the outstanding connection attempt count; and
when the connection attempt succeeds,
marking the RCE as reachable, and
decrementing the outstanding connection attempt count;
and
when the connection attempt fails in response to an expiration of a predetermined amount of time,
marking the RCE unconstrained, and
decrementing the outstanding connection attempt count.

10. The computer storage memory device of claim 9 having further computer-executable instructions for logging the queuing of the connection attempt.

11. The computer storage memory device of claim 10 having further computer-executable instructions for repeating the logging after an interval of time, wherein the queuing of the connection attempt occurs repeatedly during, and up to, the interval of time.

12. The computer storage memory device of claim 9 having further computer-executable instructions for maintaining a connection attempt as in progress for a time interval after the connection attempt is cancelled, wherein the connection attempt is an ongoing connection attempt being counted towards the outstanding connection attempt count.

13. A system configured to slow computer malware from spreading beyond the system, comprising:
a computer having memory encoded with computer-executable instructions which, when executed by the computer, implement:
a network communication module, wherein an upper bound limit on a total number of concurrent TCP network connection attempts that can be made from the system is set in the network communication module;
a queue for organizing connection attempts when a number of TCP network connection attempts in progress exceeds the upper bound limit;
a hash value generated for a connecting process that has issued a connection attempt when the number of TCP network connection attempts in progress exceeds the upper bound limit by-applying an exclusive "OR" (XOR)-based hash function to an address of a process structure in a kernel of the connecting process;

at least one hash bucket for queuing the connection attempt, wherein the at least one hash bucket is selected based on the hash value and connection attempts in the at least one hash bucket are processed in a first-in-first-out (FIFO) order; and an outstanding connection attempt counter, wherein
when a route cache entry (RCE) of the connection attempt is not reachable and does not have an ongoing connection attempt being counted towards an outstanding connection attempt counter,
the RCE is marked as constrained, and
the outstanding connection attempt counter is incremented; and
when the connection attempt succeeds,
the RCE is marked reachable, and
the outstanding connection attempt counter is decremented.

14. The system of claim 13 further comprising a log for logging the queuing of the connection attempt.

15. The system of claim 14 wherein the log repeatedly logs the queuing of the connection attempt after an interval of time, wherein the queuing occurs repeatedly during, and up to, the interval of time.

16. The system of claim 13 wherein the network communication module is a TCP module.

17. The system of claim 13, wherein the outstanding connection attempt counter is decremented if a connection attempt times out.

18. The system of claim 13 further comprising an outstanding connection attempt counter, wherein the outstanding connection attempt counter maintains a connection attempt as in progress for a time interval after the connection attempt is cancelled, wherein the connection attempt is an ongoing connection attempt being counted in the outstanding connection attempt counter.

* * * * *

UNITED STATES PATENT AND TRADEMARK OFFICE
CERTIFICATE OF CORRECTION

| | | |
|---|---|---|
| PATENT NO. | : 7,784,096 B2 | Page 1 of 1 |
| APPLICATION NO. | : 10/989912 | |
| DATED | : August 24, 2010 | |
| INVENTOR(S) | : Sanjay N. Kaniyar et al. | |

It is certified that error appears in the above-identified patent and that said Letters Patent is hereby corrected as shown below:

In column 10, line 65, in Claim 13, delete "by-applying" and insert -- by applying --, therefor.

Signed and Sealed this
Fifteenth Day of February, 2011

David J. Kappos
*Director of the United States Patent and Trademark Office*